United States Patent
Doyle et al.

(10) Patent No.: US 7,685,645 B2
(45) Date of Patent: *Mar. 23, 2010

(54) SECURITY CONTAINERS FOR DOCUMENT COMPONENTS

(75) Inventors: Ronald P. Doyle, Raleigh, NC (US); John R. Hind, Raleigh, NC (US); Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/102,127

(22) Filed: Apr. 14, 2008

(65) Prior Publication Data
US 2008/0215897 A1 Sep. 4, 2008

Related U.S. Application Data

(63) Continuation of application No. 10/632,156, filed on Jul. 31, 2003, now Pat. No. 7,515,717.

(51) Int. Cl.
G06F 12/14 (2006.01)
G06F 17/30 (2006.01)
G06F 7/04 (2006.01)
H04L 9/00 (2006.01)
H04N 7/16 (2006.01)

(52) U.S. Cl. .................. 726/27; 726/28; 726/29; 380/45; 380/277; 713/193

(58) Field of Classification Search .............. 726/27, 726/28, 29; 713/193; 380/45, 277
See application file for complete search history.

(56) References Cited

U.S. PATENT DOCUMENTS

| | | | |
|---|---|---|---|
| 5,933,498 A * | 8/1999 | Schneck et al. | 705/54 |
| 6,006,228 A * | 12/1999 | McCollum et al. | 707/9 |
| 6,144,743 A * | 11/2000 | Yamada et al. | 380/44 |
| 6,192,396 B1 * | 2/2001 | Kohler | 709/206 |
| 6,202,066 B1 * | 3/2001 | Barkley et al. | 707/9 |
| 6,226,745 B1 * | 5/2001 | Wiederhold | 726/1 |
| 6,311,269 B2 * | 10/2001 | Luckenbaugh et al. | 713/154 |
| 6,487,665 B1 * | 11/2002 | Andrews et al. | 726/26 |
| 6,532,455 B1 * | 3/2003 | Martin et al. | 706/47 |
| 2002/0184511 A1 * | 12/2002 | Kolouch | 713/189 |
| 2002/0194485 A1 * | 12/2002 | Ram et al. | 713/193 |
| 2003/0051054 A1 * | 3/2003 | Redlich et al. | 709/246 |
| 2004/0168073 A1 * | 8/2004 | Bourne et al. | 713/193 |

* cited by examiner

*Primary Examiner*—Kambiz Zand
*Assistant Examiner*—Aubrey H Wyszynski
(74) *Attorney, Agent, or Firm*—Marcia L. Doubet

(57) ABSTRACT

Methods, systems, computer program products, and methods of doing business whereby document components are secured or controlled using "security containers" which encapsulate the components (and other component metadata). A "security container" encapsulates the component (i.e., content) that is to be controlled within a higher-level construct such as a compound document. The security container also contains rules for interacting with the encapsulated component, and one or more encryption keys usable for decrypting the component and rules for authorized requesters.

11 Claims, 8 Drawing Sheets

FIG. 3A

| encryption algorithm identifier | key length | optional hints for algorithm | DN of content creator | X.509 certificate (or identifier) | key object 1 | key object 2 | ... | key object N |
|---|---|---|---|---|---|---|---|---|
| 310 | 320 | 330 | 340 | 350 | 360 | 370 | | 390 |

```
<encrypt:class type="3DES" len="168" creatorDN="cn=Joe,ou=developers,o=acme" creatorCertif=" ...">
    <encrypt:key
        DN="cn=managers,ou=groups,o=acme"
        KeyIdentifier="MIIGEjCCBbygAwIBAgIKFZrHywAQ"
        Ekey="QAAAAAzANBgkqhkiG9w0BAQUFAD"/>
    <encrypt:key
        DN="cn=E135246,ou=users,o=acme"
        KeyIdentifier="CSqGSIb3DQEJARYbYm9zc0BicnFQ"
        Ekey="QudGIucmFsZWlnaC5pYm0uY29tMQ"/>
    <encrypt:key
        DN="cn=hr,ou=groups,o=acme"
        KeyIdentifier="DIbQzc0BEYbCicnFSqGS3YJmAR9Q"
        Ekey="dpYmGmFsZWaCc50u9IntMY1u2QuQ"/>
</encrypt:class>
```

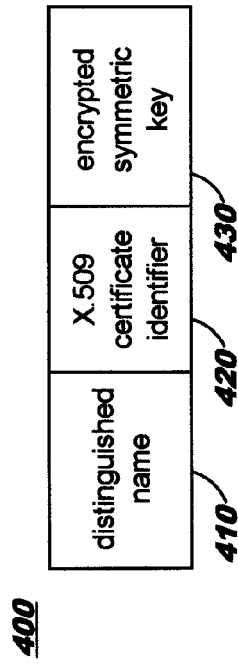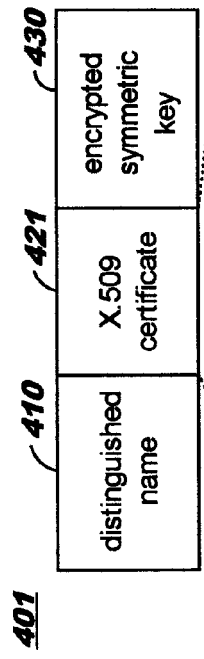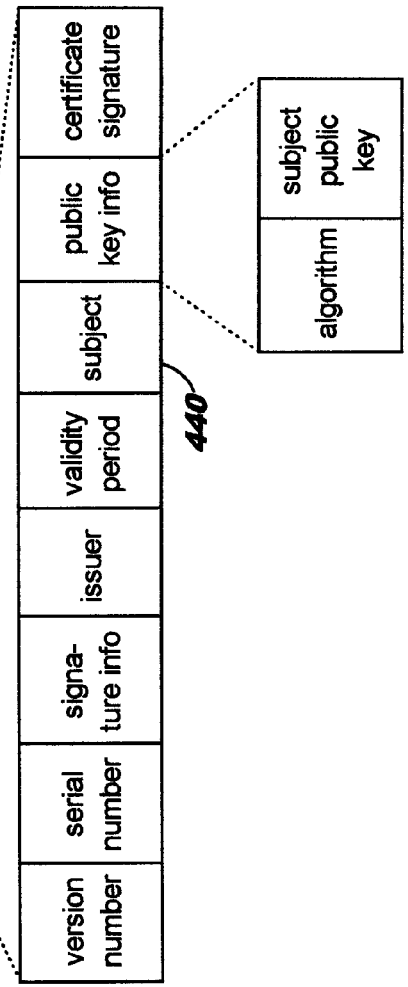
FIG. 4A
FIG. 4B

```
<encrypt:class type="3DES" len="168" creatorDN="..."
creatorCertif="...">
    <encrypt:key
        DN="cn=managers,ou=groups,o=acme"
        KeyIdentifier="MIIGEjCCBbygAwIBAgIKFZrHywAQ"
        Ekey="QAAAAAAzANBgkqhkiG9w0BAQUFAD"/>
    <encrypt:key
        DN="cn=E135246,ou=users,o=acme"
        KeyIdentifier="CSqGSIb3DQEJARYbYm9zc0BicnFQ"
        Ekey="QudGIucmFsZWInaC5pYm0uY29tMQ"/>
    <encrypt:key
        DN="cn=hr,ou=groups,o=acme"
        KeyIdentifier="DlbQzc0BEYbCicnFSqGS3YJmAR9Q"
        Ekey="dpYmGmFsZWaCc50u9IntMYIu2QuQ"/>
</encrypt:class>
```
— 710

```
<encrypt:rules>
-- encrypted version of container's rules --
</encrypt:rules>
```
— 720

```
<encrypt:hash>
-- secure hash over container's rules --
</encrypt:hash>
```
— 730

```
<encrypt:digitalSignature>
-- digital signature over encryption header and rules --
</encrypt:digitalSignature>
```
— 740

```
<encrypt:documentComponent>
-- encrypted document component --
</encrypt:documentComponent>
```
— 750

SECURITY CONTAINERS FOR DOCUMENT COMPONENTS

RELATED INVENTIONS

The present invention is related to the following commonly-assigned U.S. Pat. No. 7,010,681 (Ser. No. 09/240,387, filed Jan. 29, 1999), titled "Method, System and Apparatus for Selecting Encryption Levels Based on Policy Profiling"; U.S. Pat. No. 6,585,778 (Ser. No. 09/385,899, filed Aug. 30, 1999), titled "Enforcing Data Policy Using Style Sheet Processing"; U.S. Pat. No. 6,931,532 (Ser. No. 09/422,430, filed Oct. 21, 1999), titled "Selective Data Encryption Using Style Sheet Processing"; U.S. Pat. No. 6,978,367 (Ser. No. 09/422,492, filed Oct. 21, 1999), titled "Selective Data Encryption Using Style Sheet Processing for Decryption by a Client Proxy"; U.S. Pat. No. 6,961,849 (Ser. No. 09/422,537, filed Oct. 21, 1999), titled "Selective Data Encryption Using Style Sheet Processing for Decryption by a Group Clerk"; U.S. Pat. No. 6,941,459 (Ser. No. 09/422,431, filed Oct. 21, 1999), titled "Selective Data Encryption Using Style Sheet Processing for Decryption by a Key Recovery Agent"; and U.S. application Ser. No. 10/455,068, filed Jun. 5, 2003, titled "Method, System and Program Product for Limiting Insertion of Content between Computer Programs".

BACKGROUND OF THE INVENTION

1. Field of the Invention

The present invention relates to computer software, and deals more particularly with methods, systems, computer program products, and methods of doing business whereby document components are secured or controlled using "security containers" which encapsulate the components (and other component metadata).

2. Description of the Related Art

Traditional techniques for securing content are by providing access control and functional control at the granularity of entire files, whole documents, and sometimes individual e-mail messages. These controls are used to restrict specific operations such as the reading, writing, sending, and duplication of content. As an example of access controls, a server may require authentication of the user who requests a file and then look up the user's credentials in an access control list to determine whether to provide the file and, if so, what operations the user is allowed to perform on it.

In general, any time content is presented to a user in the clear (i.e., unencrypted), there is usually a simple way to bypass the foregoing simple prior-art access controls. After bypassing the access controls, the content can be saved in unencrypted form, modified, or sent to another user in the clear. That is, in the absence of any functional controls, once content is made available to a user, control over whether to perform further operations on the content, and who may receive and view the content, passes to the user who has the content in his possession, rather than remaining vested in the user who created the content.

Once a user receives access to content, various types of functional controls may, in some cases, be provided by various aspects of the system to govern what operations the user can perform on that content. If the content is a text file, for example, the user is typically allowed to edit the text unless the file has been marked (e.g., via an attribute maintained by the file system or operating system software) as read-only or the file has otherwise been secured against editing (such as by requiring a special password before allowing updates). Textual information might be provided in rendered form, alternatively, to prevent the receiving user from editing the text. Such controls are easily bypassed, however, and therefore the protection they provide tends to be very weak. For example, if a file-writing operation is blocked by a file-system read-only attribute, a user who is familiar with the file system can reset the attribute in a matter of seconds. Or, the user can save the file to a different file, for which the read-only attribute has not been set.

As another example of functional controls, the Lotus Notes® e-mail application can be configured not to send an outbound e-mail message having a "confidential" security attribute to any recipients whose address is outside the local intranet. Or, in some cases, an e-mail message may still be delivered to such recipients, but this message will have the text and any attachments suppressed—in effect, providing the recipient with only a notification that the sender attempted to send something more. Here, the application system is responsible for maintaining certain controls (and in this example, maintains them at a per-document, all-or-nothing level). As in the other examples which have been discussed, the user may rather easily avoid these functional controls: he simply has to remove the security attribute from the e-mail message, and the complete message can be sent. ("Lotus Notes" is a registered trademark of International Business Machines Corporation in the United States, other countries, or both.)

An encrypted document may be automatically decrypted by a process executing on the receiving client device, using prior art techniques. For example, some e-mail systems automatically decrypt e-mail messages that are received in encrypted form. Prior art techniques operating on the client device may automatically enforce functional controls on the decrypted result. For example, a multimedia player may allow the user to view a previously-encrypted movie or listen to a previously-encrypted song, but prevent the user from making a copy of the movie or of the song. This is sometimes referred to as "sealed media" or "digital rights" management.

Other types of functional controls include limiting whether various content can be transferred among programs using a "cut and paste" approach. For example, operating systems often support a dynamic data exchange, or "DDE", protocol that enables a source object to be copied to a buffer that is used to provide a "clipboard" metaphor. The source object might be, for example, a word or phrase from a text document, a graphic image or drawing used in a graphics application, and so forth. (Typically, information identifying the object's type, or an identification of the application with which it was created, is stored in the buffer along with a serialized representation of the object that is copied to the clipboard.) Once a copy of the source object's information is stored in this buffer, the ability to paste that object to a target location is controlled by the clipboard function, which first checks to ensure that the object's type is compatible with the target. So, for example, text from a source document being viewed in one window of a text editor program may be pasted into a target document being viewed in another window of that text editor program. Or, the text might be pasted into an e-mail message being composed with an e-mail application, if the e-mail application is adapted for processing this particular type of object. On the other hand, if the user attempts to paste content of a type not understood by the target application (such as a particular type of image file, or a proprietary file type), then the paste operation will fail, because the target application lacks support for that object type.

While these traditional techniques are adequate in many cases, they provide only an all-or-nothing approach to securing content. That is, a particular file (or document, message, etc.) is either completely protected with access and functional controls, or it is completely unprotected. There are many situations where it would be advantageous for the content creator to have enduring access control and functional control over the content, and/or to provide such control at a more granular level.

SUMMARY OF THE INVENTION

An object of the present invention is to provide more granular control over access to content than is available with existing techniques.

Another object of the present invention is to provide more granular control over functions performed on content than is available with existing techniques.

Yet another object of the present invention is to enable document component creators to selectively control access to, and the operations that may be performed upon, individual components of a document.

A further object of the present invention is to provide security containers that can be used to encapsulate individual document components, where the security container mediates access to, and use of, its contained document component.

Another object of the present invention is to provide fine-grained access and functional control to a component within a document, without requiring creation of recipient-specific versions thereof.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for securing document components using security containers. In one aspect of preferred embodiments, this comprises a security container that secures a document component by encapsulating, within the security container, the document component, conditional logic for controlling operations on the document component, and key distribution information usable for controlling access to the document component.

In another aspect of preferred embodiments, this comprises encapsulating, within a security container, a document component, conditional logic for controlling operations on the document component, and key distribution information usable for controlling access to the document component. The document component and the conditional logic are preferably encrypted before encapsulation within the security container. The key distribution information preferably further comprises an identification of one or more users and/or processes that are authorized to access the document component.

The identification of the one or more authorized users and/or authorized processes may specify the users/processes using their individual identification and/or using group identifications. In the latter case, a group identification identifies a group that has, as members, one or more of the users and/or processes. The group members may be determined dynamically, upon receiving a request to access to the document component. Preferably, this comprises accessing a repository where the members of the group are identified.

In addition to controlling operations on the document component, the conditional logic may also control access to the document component. In addition to controlling access to the document component, the key distribution information may further control access to the conditional logic.

Preferably, the key distribution information further comprises a symmetric key that encrypted both the document component and the conditional logic that are encapsulated within the security container, wherein the symmetric key is stored in an encrypted form for decryption by the authorized users and/or processes. A separate version of the symmetric key is preferably provided in the security container for each distinct user, process, group of users, and/or group of processes, wherein each separate version has been encrypted with a public key associated with the corresponding distinct user, process, group of users, or group of processes.

The security container may be encoded in structured document format (such as Extensible Markup Language, or "XML", format).

These aspects may further comprise: receiving, from a requester, a request to access the document component; programmatically determining, using the key distribution information, whether the requester is authorized to access the document component; and programmatically evaluating, using the conditional logic, whether the request can be granted, when the programmatic determination has a positive result, and rejecting the request when the programmatic determination has a negative result. The conditional logic preferably evaluates factors such as an identity of the requester, a device used by the requester, a context of the requester, a zone of an application used by the requester, a user profile of the requester, and/or a target destination (e.g., target application or application zone, target device(s), user profile of the target recipient(s), etc.) of the request.

The security container may be (for example) embedded within a document, placed on a user interface, or passed from a source to a destination using techniques that include a clipboard, an application programming interface, interprocess communications, or a messaging system. When the document component is to be copied to a target destination, in the absence of conditional logic that specifically permits copying the component directly, the entire security container is copied.

The disclosed techniques may also be used advantageously in methods of doing business, whereby a service is offered to clients for controlling access to document components using security containers. This service may be provided under various revenue models, such as pay-per-use billing, monthly or other periodic billing, and so forth, and may offer clients advantages that include more granular control of access to, and functional control over, portions of content within a higher-level construct (that is, a document component within a document); secure distribution of content portions; and secure storage of content portions.

The present invention will now be described with reference to the following drawings, in which like reference numbers denote the same element throughout.

BRIEF DESCRIPTION OF THE DRAWINGS

FIG. 3A illustrates the structure of a "key class" used in preferred embodiments, and FIG. 3B provides an example using this structure;

FIG. 4A depicts the structure of a "key element" that forms part of the key class of preferred embodiments, and FIG. 4B depicts an alternative structure;

FIG. 7 shows, conceptually, how a security container represents this information to a user or process that has not yet been authenticated;

DESCRIPTION OF PREFERRED EMBODIMENTS

Figure 1:
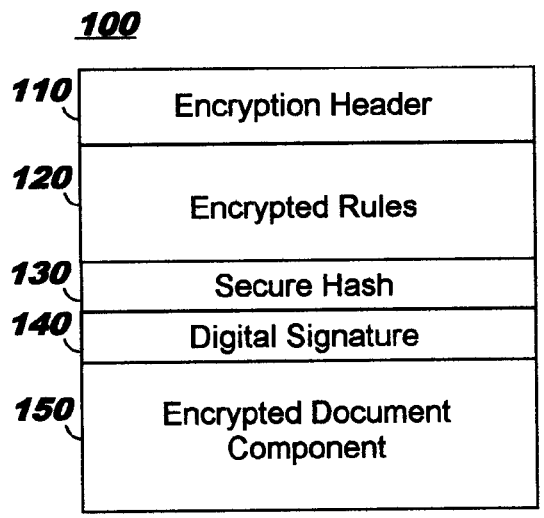
FIG. 1 illustrates, at a high level, how a security container may be structured, according to preferred embodiments of the present invention.

Whereas prior art techniques typically provide access and functional controls at the level of an entire file, link, document, or e-mail message, the present invention enables extending these controls to portions of content, thereby providing a more flexible and finer-grained approach. Controls can therefore be exercised at the level of individual portions of a higher-level construct, where this higher-level construct is referred to herein (for purposes of illustration but not of limitation) as a compound document, a document, or a file. The individual content portions are referred to equivalently herein as components, document components, or objects.

A "security container", as disclosed herein, encapsulates the content portion that is to be controlled within a higher-level construct such as a compound document. A content creator may designate any portion of content for encapsulation within a security container, in order to enable individually controlling that content, and a particular compound document may therefore include more than one security container when multiple content portions are to be individually controlled. Stated in another way, a document may be logically structured as having more than one component, and the component creator of any of these components may choose to place that in its own security container. Examples of content portions that may be controlled according to techniques disclosed herein include: individual paragraphs, sentences, or words within a text document; a table or cell within a spreadsheet; a drawing or chart from a presentation slideset; an image or frame from an animation; and so forth.

The concept of compound documents is known in the art, and denotes a document that may be comprised of numerous different types of content or different types of objects. The "OLE" framework from Microsoft Corporation, for example, provides an application programming interface ("API") to create and display a compound document that might be composed of objects for text, graphics, animation, and so forth. Under this framework, a document is an object container that orchestrates activation of the elementary objects it contains. According to the present invention, some number of these elementary objects are security containers that encapsulate the original content object (referred to herein as a document component) for which access and/or functional use are to be controlled.

According to the present invention, metadata is associated with each document component that is part of a higher-level document. (Note that the term "document" is used herein in an illustrative manner, and should be interpreted as including files, messages, and so forth.) For a particular document component, the metadata enables providing a variety of different types of access control and/or functional control. This lower-level application of control over individual document components may be based on a number of factors, as will be described in more detail herein, in order to provide varying levels of restrictions pertaining to a document's content. For example, some users may be permitted to view selected portions of a document, while other users are allowed to view and edit those portions, and still other users are not allowed to view the protected portions or to operate upon them in any way. More complex conditions may be used for specifying access and functional controls as well, and examples will be described herein.

The security containers of the present invention encapsulate not only the document component being controlled, but also the metadata that provides the access and functional controls for that document component. Stated in another way, the security container carries the document component and a set of rules that govern who can access the component and what they can do when granted access.

Some parts of a security container are encrypted, and other parts are in the clear but are effectively protected from tampering through the use of public-key encryption, as will be more fully described hereinafter. (Prior art techniques for distributing and installing code securely are preferably used to minimize the risk of a hacker being able to bypass the protections of a security container, for example by overlaying the code that processes security container interactions with malicious code that pretends to be the code of the security container implementation. These prior art techniques, which are outside the scope of the present invention, protect the security containers on devices where their contents are being used.)

A security container can be copied, embedded in a document, placed on a user interface, and/or passed from a source to a destination using techniques that include a system clipboard, an application programming interface, interprocess communications, and a messaging system. Therefore, even though it is copied or transferred, the security container still carries the metadata that controls access to the contained data being protected, thereby carrying out the component creator's intentions despite the content being passed to other users.

In this manner, the security container not only restricts access to a document component to those users who are authorized, but also limits the effects of accidental and/or malicious dissemination of information to unauthorized users. Most computer users are familiar with the scenario of attempting to paste something from the clipboard into a document or message, only to learn that what was actually stored on the clipboard was not what they were expecting. In many cases, this is merely an annoyance that can be corrected by undoing the accidental paste and then locating the desired content, placing it on the clipboard, and repeating the paste operation. However, if the user does not discover the error, there may be serious repercussions. For example, the user might be communicating by online chat with his friends while at the same time preparing a confidential business report for senior management. If the user accidentally copies unsecured confidential information from his report into his chat session, there may be no way to prevent that information from being delivered to his friends. When using the present invention, on the other hand, the security container continues to protect its encapsulated content even if it is accidentally or intentionally passed to unintended or unauthorized recipients.

FIG. 1 provides a conceptual view of how a security container 100 is structured, according to preferred embodiments. In preferred embodiments, an encryption header 110 is provided, containing both encrypted and unencrypted information. The encryption header 110 contains information in the clear that is used to make a first-pass determination as to which requesters are authorized to access encrypted portions of the security container. The encryption header also carries one or more encrypted symmetric keys that enable authorized requesters to access the encrypted portions. A preferred structure for the encryption header 110 is described below with reference to FIG. 3A, and an example of using this structure is described with reference to FIG. 3B.

Each security container includes access and/or functional controls which are preferably specified by rules, as stated earlier. According to the present invention, these rules are stored within the security container in encrypted form. See element 120. Encrypting the rules increases assurance that unauthorized users cannot operate on the document component in the security container. (Note that the term "rules" should not be construed as limiting embodiments of the present invention to use with rule-based systems or rules engines. The rules may be implemented simply as Boolean values, lists of permitted operations, conditional logic, and so forth.) In preferred embodiments, the rules are encrypted with a symmetric key, and this symmetric key is itself encrypted, once for each authorized user, process, user group, or group of processes, with a public key of that authorized entity. The resulting encrypted symmetric key for each such authorized entity is contained within encryption header 110, as noted above. The encryption header therefore provides a secure, efficient way of distributing key material for the authorized entities, as will be described in more detail below. (References herein to authorized users or user groups are to be interpreted as applying also to authorized processes or groups of processes.)

The encrypted symmetric keys may optionally be protected with an additional level of encryption, for example, to prevent a hacker from being able to compromise the security containers by installing malicious code that pretends to be the security container implementation code. (The malicious code might intercept a user's private key, use that to decrypt the security container's document component, and then use that document component without regard to the security container's embedded rules, for example.) Rather than encrypting the symmetric key just with the public key of the authorized users, this optional enhancement uses a secret key known to the security container implementation code to hide the symmetric key. Preferably, this secret key is a symmetric key, and is therefore used for both encryption and decryption of the symmetric key used to encrypt the rules and document component. Alternatively, a public key infrastructure ("PKI") public/private key pair may be used. In a first aspect of this optional enhancement, the symmetric key that encrypted the rules and document component is first encrypted with a public key of an authorized user or user group, and then the secret key known to the security container implementation code is used to encrypt the result. (This process is repeated for each authorized user or user group.) In a second aspect of this optional enhancement, the symmetric key that encrypted the rules and document component is first encrypted with the secret key known to the security container implementation code, and that result is then encrypted with the public key of each user or user group. In either aspect, the additional encryption provides increased assurance that the underlying symmetric key is made available only to authorized users who are interacting with the legitimate security container implementation code.

A secure hash 130 is preferably computed over the unencrypted form of rules 120, and this secure hash is unencrypted in the security container. A secure hash may be created using techniques that are well known in the art, such as the SHA-1 algorithm or MD5 algorithm. Preferably, a predetermined algorithm is used; alternatively, the algorithm may be identified in the encryption header (not shown). Appending the unencrypted secure hash to the encrypted rules enables a recipient attempting to decrypt and interpret the rules to determine whether decryption has been successful (as will be described in more detail with reference to Blocks 840-850 of FIG. 8).

A digital signature 140 is preferably computed over the rules and the encryption header. Techniques for computing digital signatures are well known in the art. In preferred embodiments, the digital signature is computing by hashing the rules and encryption header, and then signing this hash with the component creator's private key (corresponding to his well-known public key). The resulting digital signature 140 is unencrypted in the security container. Preferred embodiments use the unencrypted rules in this process, although the encrypted rules may be used in alternative embodiments. To enable easily locating the component creator's public key for a subsequent validation of the digital signature (discussed in more detail with reference to Blocks 840-850 of FIG. 8), preferred embodiments include a distinguished name ("DN") or similar unambiguous identifier of the component creator and/or his X.509 certificate (or an identifier thereof) in the encryption header. See elements 340 and 350 of FIG. 3A.

Finally, each security container 100 includes a document component, also encrypted, as shown at element 150 of FIG. 1. According to preferred embodiments, the document component is encrypted using the same symmetric key that was used to encrypt the rules.

In preferred embodiments, the controls embodied in a security container's rules are based on factors such as 1) permissions, 2) context, 3) zone, and/or 4) environmental verification rules. Some of these factors may pertain to the user, while others may pertain to factors such as the source of the encapsulated document component and/or the destination of an operation requested for that component. Each of these factors will now be discussed in more detail.

1) Permissions may include conventional attributes such as permission to read or write, as well as finer-grained unconventional attributes such as "raw data may be recovered" (meaning the security container's document component may be copied in the clear, without a security container), "editing in place is allowed" (i.e., edits can be made to the document component within the existing security container), "rendering on an unsecured device is allowed", "must render obscured", "may not resize", "render in color only", "may not print", "may not store on a network file server", "may not send in e-mail outside the company intranet", and so forth.

2) The context of a request is generally information pertaining to what is happening when the request is received, and may include information such as the device type from which the request was received; the application that generated the request; the hardware and/or software available on the requesting device; the network connection type over which a request was received, if applicable; a physical location of the requester; and so forth.

3) A "zone" may include information such as a security classification of the document in which the security container is embedded, a security zone of a Web site in which a document is being rendered, an isolation zone to which the embedding document (i.e., the document holding the security container) belongs, and so forth. Isolation zones are disclosed in commonly-assigned U.S. patent application Ser. No. 10/455,068, "Method, System and Program Product for Limiting Insertion of Content between Computer Programs" (Ser. No. 10/455,068, referred to hereinafter as "the isolation zone invention"). For example, an isolation zone may be used to define a collection of application programs and/or files that are used only for business purposes (a "business zone"), or only for personal use (a "personal zone"), etc. As disclosed in this commonly-assigned patent, isolation zones may be used to limit insertion of content across zone boundaries. When an attempt is made to insert content from one zone into another zone, the user may be prompted to confirm whether he wants to proceed, or he may be required to provide security credentials before the insertion can proceed, and so forth. Use of business and personal isolation zones thereby reduces the likelihood of (or prevents) the inadvertent insertion of personal information into business-related content and vice versa. (Other types of isolation zones may also be defined and used to limit content insertion, according to this commonly-assigned patent, and references herein to business and personal zones are for illustrative purposes.)

4) Examples of environmental verification rules include "prompt for the requester's ID and password on each use", "accept the user identity from the currently-executing process", "three-part user authentication is required on each use" (i.e., authentication comprising what you know, who you are, and what you have), "accept the context [and/or the zone] of the embedding document", and "use the context [and/or the zone] of the currently-executing process".

A compound document of the prior art orchestrates activation of its elementary objects, as stated above. Objects of the prior art are typically stored persistently in a serialized form, as is well known. Part of the orchestration process is to deserialize and instantiate objects so their methods and properties can be exercised. The manner in which the security containers of preferred embodiments are used in this environment will now be described.

According to the present invention, each security container acts as a proxy for, that is to say, stands in the place of, the document component it protects, and filters all method and property activities. The document component may be, for example, rich text, a spread sheet cell, a picture, an object collection, and so forth.

Figure 2:
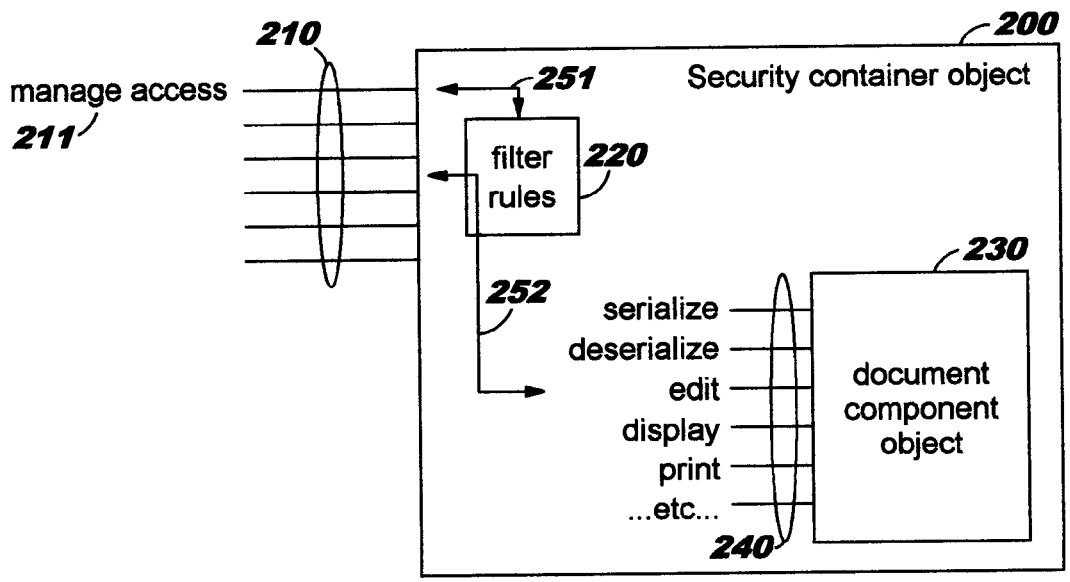
FIG. 2 illustrates, at a high level, how a security container controls access to document components according to preferred embodiments of the present invention.

FIG. 2 depicts a model of object-oriented security container operations. A security container object 200 is shown, containing document component object 230. The security container 200 has an interface depicted generally at 210, comprising methods and properties for interacting with the container object. In addition, document component object 230 has an interface 240, for interacting with the document component object. Examples of methods on the document component object interface 240 are shown, and include serialize, deserialize, edit, display, and print.

The security container also comprises rules, or "filter rules", 220. These filter rules intercept method invocations from interface 210. If the intercepted invocation refers to the document component object 230, then the filter rules 220 determine whether a method or property from the document component object's interface 240 can be invoked. This is represented in FIG. 2 by arrow 252, which connects the interface 210 to the interface 240.

On the other hand, the security container itself has some methods and properties of its own, and thus the intercepted invocation may refer to one of these rather than to the document component object 230. The interface 210 to the security container preferably includes, for example, one or more methods for managing access to the contained object. Thus, a method referred to as "manage access", depicted at 211, might be used by an administrator or other privileged user to add, change, or delete users or user groups (or processes, equivalently) in the list of authorized entities. This is represented in FIG. 2 by arrow 251.

Before discussing embodiments of the present invention in further detail, several commonly-assigned inventions will first be described. Commonly-assigned U.S. Pat. No. 7,010,681 (Ser. No. 09/240,387), titled "Method, System and Apparatus for Selecting Encryption Levels Based on Policy Profiling", teaches techniques that operate with documents having multiple levels of security for sections of their contained content. When a user requests a document, the user's access rights are determined, and any document sections for which this user's access rights are insufficient will be "filtered out", i.e., deleted from the document version provided to that user. In addition or instead, the filtering may be based on information such as whether the user's device is sufficiently secure to receive various sections of the document or whether the device is capable of decrypting the content, once received. The sections not filtered out of the document are then encrypted, using an encryption technique selected using a policy profile that is adapted to variable security levels. This is distinct from the present invention, which provides an identical document component, protected within an identical security container, to all recipients and does not conditionally modify a document for different users, as in the commonly-assigned invention.

Commonly-assigned U.S. Pat. No. 6,585,778 (Ser. No. 09/385,399), titled "Enforcing Data Policy Using Style Sheet Processing", teaches techniques whereby the content of a document is controlled using stored policy information. Stored "policy objects" are disclosed, where these policy objects are referenced in the schema or Document Type Definition ("DTD") that defines allowable document syntax. As an example of using a policy object for enforcing data policy, the context of a user who requests a document can be determined, and a policy object can evaluate whether selected portions of that document should be delivered to the user, given his current context. Extensions to these policy objects are defined in commonly-assigned U.S. Pat. No. 6,931,532 (Ser. No. 09/422,430), which is titled "Selective Data Encryption Using Style Sheet Processing" (hereinafter, "the selective data encryption invention").

The extended policy objects and techniques disclosed in the selective data encryption invention enable restricting element visibility to one or more "communities" through use of community-specific encryption (where a "community" is a collection of authorized viewers of information, including humans as well as programmatic entities or processes). Thus, for example, an extended policy object identifies the community of users or processes that is authorized to access a document element, and the encryption strength to be used when encrypting that document element. Policy objects, as disclosed in these inventions, preferably comprise code that may be executed to carry out element-specific processing on content encoded in a structured document.

The selective data encryption invention also teaches techniques whereby a policy-driven augmented style sheet processor is used to create a selectively-encrypted document that carries its own key distribution material. That is, the Document Object Model ("DOM") for a structured document is programmatically modified to include information that can be used to selectively decrypt the encrypted elements of the structured document. Each element may be encrypted for one or more authorized communities (e.g, individual users or processes, or groups of users or processes). Accordingly, the key distribution material allows decryption of a particular document element only if the requester or target receiver is a member of the community that is authorized for that element.

This key distribution technique is leveraged by preferred embodiments of the present invention, and is described in more detail below.

Alternative approaches for performing the decryption of a document that has been selectively encrypted according to the selective data encryption invention are disclosed in commonly-assigned U.S. Pat. No. 6,961,849 (Ser. No. 09/422,537), titled "Selective Data Encryption Using Style Sheet Processing for Decryption by a Client Proxy", U.S. Pat. No. 6,978,367 (Ser. No. 09/422,492), titled "Selective Data Encryption Using Style Sheet Processing for Decryption by a Group Clerk", and U.S. Pat. No. 6,941,459 (Ser. No. 09/422,431), titled "Selective Data Encryption Using Style Sheet Processing for Decryption by a Key Recovery Agent". These commonly-assigned inventions, in addition to the selective data encryption invention, are referred to hereinafter as "the referenced inventions", and are hereby incorporated herein by reference as if set forth fully.

Returning now to discussion of the present invention, the authorized users for content within a security container are preferably identified using a "key class" mechanism, where this key class securely distributes symmetric keys to the community authorized to view the content. In particular, the approach disclosed in the selective data encryption invention is used in preferred embodiments. The other referenced inventions use the key class when performing decryption in various ways, and these decryption approaches may be used with embodiments of the present invention (as described in more detail below).

Along with encrypted symmetric keys, a key class carries, in the clear, information that can be used to identify the authorized users of the document component inside a security container, as stated earlier. In addition, the key class preferably identifies the encryption algorithm that was used to encrypt the security container's rules and document component, as well as the key length used by that algorithm, and information that can be used to obtain the component creator's well-known public key. The structure of a key class is illustrated in FIG. 3A, and an example key class is shown in FIG. 3B.

As shown in the diagram of FIG. 3A, each key class 300 includes an identification of its encryption algorithm (element 310), its key length (element 320), zero or more hints for use with the algorithm (element 330), a DN of the component creator (element 340), an X.509 certificate of the component creator or an identifier of this X.509 certificate (element 350), and one or more key objects (elements 360, 370, . . . 390). In preferred embodiments, key class 300 is used as the encryption header 110 of FIG. 1. Accordingly, references to a key class or to an encryption header are used interchangeably herein.

In preferred embodiments, the DN 340 and X.509 certificate or certificate identifier 350 of the component creator (whose private key is used for certain operations on the security container) are provided in the clear within the security container so that recipients can obtain the corresponding public key. Because X.509 certificates are relatively large, use of a certificate identifier, rather than the entire certificate, is preferred. The certificate itself can then be retrieved using the certificate identifier when needed. (Other types of security credentials may be used in place of the X.509 certificates or certificate identifiers described herein, without deviating from the scope of the present invention.) The component creator's public key may be needed, for example, in order to validate a digital signature which has been computed over portions of the security container. (Refer to the discussion of Blocks 840-850 of FIG. 8.)

Referring now to FIG. 3B, XML notation is used herein when depicting the examples, including this example key class 301, for purposes of illustration but not of limitation. Thus, the example key class 301 is encoded using a "class" element 302 that has a "type" attribute 311 and a "len" (i.e., length) attribute 321. The type attribute is used to identify the encryption algorithm (element 310 in FIG. 3A), and the length attribute specifies the key length (element 320 in FIG. 3A). The optional hints 330 referenced in FIG. 3A have not been represented in FIG. 3B, and may include things such as padding bits to initialize a block cipher.

Note that the selective data encryption invention discloses the ability to use multiple key classes within a single file. The key class described therein therefore has a "name" attribute that is used to distinguish among the key classes. Because preferred embodiments of the present invention use an identical set of rules for controlling the document component in a particular security container, it is not necessary to allow more than one key class per container. The descriptions herein therefore omit the use of a name attribute. In alternative embodiments, multiple key classes may be used within a particular security container. For example, it may be deemed useful to allow more than one encryption algorithm for encrypting the document component in a particular container, in which case a different key class may be specified for each algorithm. In this case, the key elements (described below) are preferably replicated among the key classes, so that all authorized users are authorized to use any of the allowed algorithms. This alternative approach may be useful, for example, where the target audience for a security container may support a variety of encryption algorithms but where all members of that audience do not necessarily support the same encryption algorithm.

In addition to a type and length attribute, attributes of the key class are also preferably used to specify the creator's DN and X.509 certificate identifier. See elements 341, 351 in FIG. 3B. In addition, while the digital signature has been shown as a distinct element 140 in FIG. 1 (see also element 740 of FIG. 7), in alternative embodiments, this value may be specified as an attribute of the key class 301.

Each key class also contains one or more child elements which are referred to herein as "key" elements. These key elements are represented in FIG. 3A by key objects 360, 370, . . . 390. In FIG. 3B, the example key class 301 has three key elements 361, 371, 381. (An expanded version of example key class 361 is provided in FIG. 5, for discussion of the individual elements contained therein.) Each key element defines an individual user or process that is authorized to access this security container's document component, or a group of users or processes that is authorized. The preferred structure of each key element is depicted in FIG. 4A. As shown therein, a key element 400 is comprised of a distinguished name 410, an X.509 certificate identifier 420, and an encrypted symmetric key 430. The DN 410 is in the clear in preferred embodiments, so it can be programmatically scanned to determine whether to attempt decryption of the associated encrypted symmetric key.

As an alternative to using an X.509 certificate identifier 420 as shown in FIG. 4A, the entire X.509 certificate may be encoded within the key element if desired. FIG. 4B illustrates this alternative approach. As shown therein, key element 401 includes the distinguished name 410 (in the clear) and encrypted symmetric key 430, as in FIG. 4A, but the entire X.509 certificate is encoded at 421. (As will be obvious, the X.509 certificate identifier 420 or X.509 certificate 421 are unencrypted when stored as the value of a key class attribute.)

Figures 5, 6:
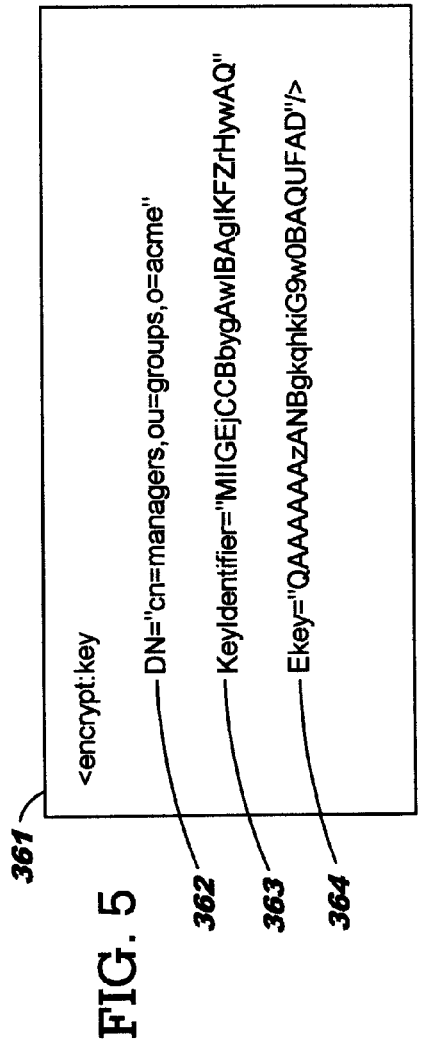
FIG. 5 provides an example key element using the structure shown in FIG. 4A.
FIG. 6 illustrates a sample employee record that is used when describing preferred embodiments.

Referring now to FIG. 5, an example key element will be described in more detail. This key element 361 is the first-listed key element from the sample key class 301 of FIG. 3B, and adheres to the structure shown in FIG. 4A. In this example, the DN attribute 362 (notably, in the clear) specifies that this key element pertains to the Acme organization ("o=acme"), and more particularly, to an organizational unit thereof named "groups" ("ou=groups") that has the common name "managers" ("cn=managers"). This is intended to refer to an entry in a directory, where the entry preferably contains a list of individuals who are within the managers group (i.e., the group of managers of the Acme organization). A sample value is provided for the keyIdentifier attribute 363, merely to allow visual representation. (In actual operation, this value, along with the value of Ekey attribute 364, is preferably encoded in binary format using "base 64" encoding that is known in the art, such that the result contains only printable characters that are permissible in XML attribute values.)

The value of Ekey attribute 364 is an encrypted version of a symmetric key. The underlying symmetric key was used to encrypt the rules and document component of the security container, and can therefore be used to decrypt that information for an authorized requester. According to preferred embodiments, techniques disclosed in the referenced inventions are used to create the encrypted version of the symmetric key, and a different encrypted version of that symmetric key is created for each distinct key element (e.g., as shown in the Ekey attribute of key elements 361, 371, 381), thereby securely distributing the symmetric key to each authorized entity. In particular, the public key associated with the entity whose key identifier 363 (see also element 420 of FIG. 4A) is specified in the key element 361 is used to encrypt the symmetric key, such that the entity's private key can then be used to recover the symmetric key in clear text. Therefore, referring to the key elements within key class 301 of FIG. 3B, key element 361 includes (in its Ekey attribute) the symmetric key as encrypted by the public key of the managers group, key element 371 includes this same symmetric key as encrypted by the public key of an individual user (having common name "E135246" and organizational unit "users" in the DN attribute value), and key element 381 includes the same symmetric key as encrypted by the public key associated with the "hr" (for "human resources") group.

In the case of a group, the DN identifies the group. Individuals who are members of the group use techniques outside the scope of the present invention to obtain the group's private key or request that it be employed on their behalf Commonly-assigned U.S. Pat. No. 6,978,367 (Ser. No. 09/422,492), titled "Selective Data Encryption Using Style Sheet Processing for Decryption by a Group Clerk", defines one way to accomplish this. (The public key in the X.509 certificate may therefore belong to a group that is identified in the "subject" field 440, while the DN belongs to the group clerk.) However, other techniques may be used for determining a group's membership and utilizing the group's private key on behalf of individual group members, without deviating from the scope of the present invention.

The manner in which the encryption algorithm and key length are selected, and in which the value of the symmetric key is determined, does not form part of the present invention. One way in which the algorithm and key length may be selected is described in commonly-assigned U.S. Pat. No. 7,010,681 (Ser. No. 09/240,387), "Method, System and Apparatus for Selecting Encryption Levels Based on Policy Profiling".

Use of the key class element to protect access to a security container's rules and document component will now be described with reference to an example. Suppose that a compound document includes information about various employees of the Acme organization, and that the personal information about each employee is considered sensitive (i.e., requires protection against unauthorized access). The content creator (e.g., the person who writes or uses a software application to create this compound document) may therefore specify that each employee record is to be enclosed in a security container. Further suppose that access to each protected employee record is to be restricted to that employee, any manager of the Acme organization, and anyone who works in the HR (human resources) department of Acme. (As will be obvious, although each security container contains an employee record in this example, in other scenarios the document components of various security containers within a particular compound document do not necessarily contain similar document components.)

A sample employee record 600 is provided in FIG. 6, using XML format. The current salary and medical information for this employee (encoded with the "curr_salary" and "medical_condition" elements, respectively) may be considered sensitive or confidential information, thereby necessitating controls over access to the employee record, and controls on the functions that can be performed on that record. These access and functional controls may be provided by the present invention's security container. FIG. 7 shows, conceptually, how the security container represents the employee record 600 to a user or process that has not yet been authenticated. In other words, the document component 600 from FIG. 6 is stored in the security container in encrypted, unintelligible form, denoted generally by element 750 of FIG. 7. The encryption header 710 of security container 700 contains, in this example, the key class 301 from FIG. 3B. Security container 700 also contains a set of encrypted rules (denoted generally by element 720), a secure hash (denoted at element 730) that has been created over these rules, and a digital signature 740 that has been created over the key class 710 and the rules. As has been described with reference to the example in FIG. 3B, key class 301 contains key elements for three different sets of users (including two groups of users and one individual user). Thus, any user who is in either of the groups, or who is the specified individual user, has at least some access rights to the information in security container 700. Software acting on the user's behalf can quickly determine, by scanning the non-encrypted DN portions of the key classes, whether to proceed with attempting decryption of the encrypted elements (i.e., the encrypted symmetric key specified as the value of the corresponding "Ekey" attribute) using an associated private key.

Figure 8:
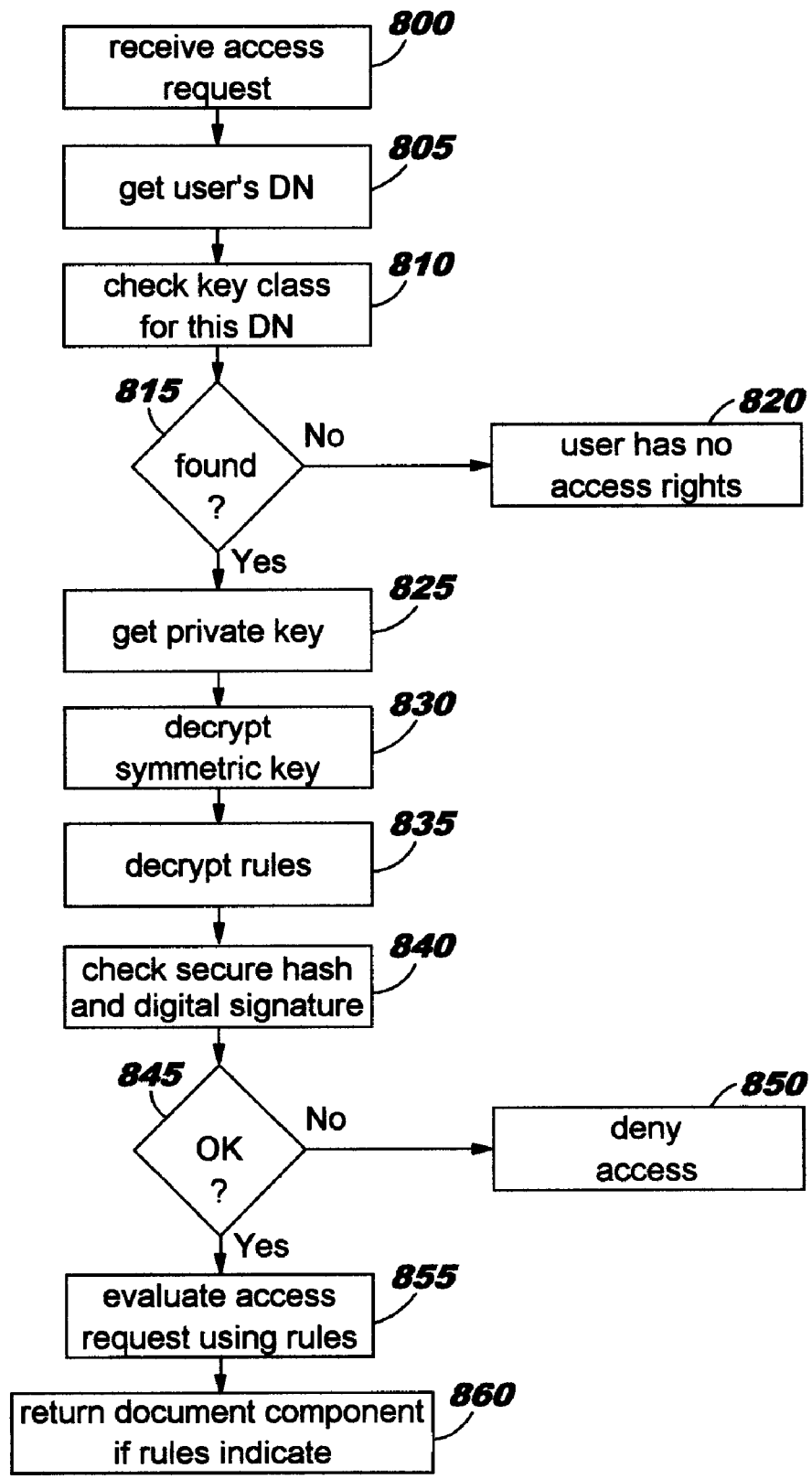
FIG. 8 provides a flow chart that sets forth logic which may be used to implement preferred embodiments of the present invention.

FIG. 8 illustrates the operations performed in preferred embodiments when a requester requests access to a document component mediated by a security container. The security container's interface 210 receives the user's access request (Block 800). (References herein to a "user", "requester" or "requesting entity" should be interpreted as applying equally to a human user as an individual or as a group member, and to programmatic processes or entities such as an executing program that requests a document component. As with human users, programmatic processes may be identified individually in a key object, or by using a key object that represents a group of processes.) A DN of the user is then obtained (Block 805), for example, from local storage or from a directory using prior art techniques.

The user's DN is then compared to the DN attributes of the key elements in the security container's encryption header (Block 810). Even if the user's DN is not directly listed in the encryption header (e.g., as shown in the key element 371 of FIG. 3B, which identifies a particular user), the user may still have access rights by virtue of being a member of a group that has access rights. Group membership is evaluated by expanding the groups specified in the key elements, in order to identify each group member. Preferably, the group's DN is used to consult a directory, wherein identifiers of the group's members have previously been stored.

Using group membership to identify authorized users provides a very flexible and advantageous way of controlling access rights, and use of group membership to identify authorized users was disclosed in the referenced inventions. This approach is leveraged by the present invention to control access to a document component in a security container. For example, if user "Bob" is not the specified individual user associated with the "cn=E135246" value in key element 371, and is not in the managers group represented by key element 361 or the HR group represented by key element 381, then Bob will be denied access to the security container. However, if Bob later becomes a manager, he will automatically have access to every security container for which the managers group is an authorized user, simply by adding his DN (or other identifier, depending on how the directory identifies group members) to the managers group definition in the directory that defines group membership. The individual security containers do not need to be changed (including, in particular, the code that determines which users are authorized), nor does the code that creates the secured document component.

It should be noted that techniques for authenticating a user, determining a user's membership in a group, providing the group's private key to the user, and performing decryption using the group's private key on behalf of the user are outside the scope of the present invention. Techniques disclosed in the commonly-assigned U.S. Pat. No. 6,961,849 titled "Selective Data Encryption Using Style Sheet Processing for Decryption by a Group Clerk" are one way in which this could be done.

Optionally, a local cache may be maintained to store the symmetric key derived from a group clerk on behalf of a group member, so that the security container may be accessed by the same user in the future if the group's clerk cannot be contacted (e.g., if no network connection to the group clerk is available or the group clerk process is off-line). This has not been illustrated in FIG. 8, but may be readily incorporated by one of skill in the art once the teachings disclosed herein are known. Preferably, the cached entry uses a structure similar to the key elements shown in FIG. 4A and illustrated in FIG. 5. In this cached entry, the symmetric key decrypted by the group clerk has been re-encrypted by this individual user's public key. In addition, the user's DN and an identifier of the user's X.509 certificate are preferably specified instead of the group clerk's information. An additional field may be added to correlate this user to the group in which he was determined to be a member. A special rule may be used to indicate the cache persistence time allowed for such cached entries.

Returning to the discussion of FIG. 8, if a match is found (Block 815), either for the user as an individual or as a group member, then this user has access rights, and control transfers to Block 825. Otherwise, the requester has no access rights to the encapsulated document component (Block 820), and the security container prevents that requester from learning anything more about the document component. A read-only icon that depicts a lock (or a similar user interface metaphor signifying that access to the document component is denied) may be returned to the requester, in order to indicate to the user that this document component is locked and therefore cannot be accessed. Alternatively, an exception could be thrown, or an error message, error code, or other indication may be returned, as desired in a particular implementation. The processing of FIG. 8 then ends for this access request.

When control reaches Block 825, then this user is authorized to access (i.e., decrypt) the security container's rules, and depending on evaluation of those rules, has at least some rights to access and perform specified functions upon the document component within the security container. Block 825 therefore obtains the private key that corresponds to the public key that was used to encrypt the symmetric key which protects the security container's rules and document component.

In the case of an individual user, the private key is the user's private key corresponding to the identity and public key in an X.509 certificate for this user. The private key is typically securely stored in local storage at the user's computer. If the user has more than one PKI public/private key pair and corresponding certificate, then the key identifier from the key element in which this user's DN is found may be used to identify the correct certificate (and associated private key). For example, if a particular user's DN matches the "DN" attribute value in key element 371 of FIG. 3B, then the value of the "keyIdentifier" attribute of that key element identifies the X.509 certificate corresponding to the public key value that was used to encrypt the "Ekey" attribute value of key element 371. Accordingly, the private key corresponding to that X.509 certificate is then used to decrypt the symmetric key (in the Ekey attribute) from the key class in the encryption header (Block 830).

Alternatively, if the user is authorized by virtue of being a group member, then the private key obtained at Block 825 is a private key associated with the group. In some embodiments, group members each have a copy of the group's private key. In preferred embodiments, however, the group members do not individually store this group private key. Instead, a group clerk previously designated for each group maintains the private key. Use of a group clerk is disclosed in the referenced inventions, which explain in detail how the clerk is contacted and how the clerk verifies whether the user is indeed a group member (e.g., by authenticating the user and comparing the user's identification to the known group members, as discussed above).

The group clerk preferably performs the decryption of the encrypted symmetric key at Block 830 on behalf of a group member, using the clerk's copy of the group's private key, and returns the decrypted symmetric key to the user over a mutually-authenticated secure channel (established, for example, using a protocol such as the Secure Sockets Layer or, "SSL", or the Transport Layer Security protocol, or "TLS"). Alternatively, if a secure channel is not established, then the group clerk preferably performs the decryption using the group's private key, and then re-encrypts the now-clear-text symmetric key using the user's public key. This re-encrypted version of the symmetric key can then be delivered to the user over a non-secured channel, after which the user decrypts the symmetric key with his own private key. (Alternatively, the re-encryption may be performed using a symmetric key shared by the group clerk and the group member or members.)

Whether the user is authorized individually or by being a group member, upon reaching Block 835, the symmetric key for this user is now available. This symmetric key is then used to decrypt the rules from the security container.

In Block 840, the secure hash and digital signature contained in the security container are verified. The secure hash of the rules (see element 130 of FIG. 1 and element 730 of FIG. 7) enables determining whether the proper private key was used to recover the symmetric key (i.e., in the decryption performed at Block 830). This cannot easily be determined by simply inspecting the result of Block 830: the string of bits that is obtained might be just an unusable random string, or it might alternatively be the real symmetric key, which will provide valid rules (from the decryption at Block 835) and a valid decrypted document component (if decryption is permitted by the rules). Obviously, it would be unacceptable for the security container to provide a corrupted version of the rules or the document component simply because an invalid symmetric key was used. Therefore, a secure hash is computed over the decrypted rules resulting from Block 835, using well-known prior art techniques, and this newly-computed hash is compared to the secure hash value 130.

If the newly-computed hash matches the secure hash 130, this indicates an increased assurance that the correct symmetric key has been used to decrypt the rules, and that the security container may proceed to interpret the rules and, if the user is authorized, to decrypt the document component. See Blocks 855 and 860, where use of the rules is described. A non-match in the hash values indicates that a proper symmetric key has not been used to decrypt the rules at Block 835, in which case those rules cannot be used. Accordingly, the attempt to access the security container may be denied, as shown at Block 850. For example, a "protected content unavailable" indication may be returned. Or, an iterative process (not shown in FIG. 8) may be used that continues processing key classes if the user has a different authorized identity. In this iterative process, control preferably returns to Block 805 to get a different DN for the user, and Blocks 810-840 check whether this DN is authorized, obtain the private key associated with that DN, use that private key to decrypt the symmetric key, use the decrypted symmetric key to unlock the rules, and then recompute the hash and compare it to secure hash 130 to determine whether this version of the rules is acceptable.

The processing of Block 840 also comprises obtaining the public key of the component creator, in preferred embodiments. This public key may be obtained in a number of different ways without deviating from the scope of the present invention. For example, the component creator's DN from the encryption header 110 may be used to look up the component creator in a directory that stores public keys. Alternatively, the component creator's public key may be contained in an X.509 certificate included in the encryption header 110, or an X.509 certificate identifier from the encryption header 110 may be used to locate this certificate, and the public key value can then be retrieved from the certificate.

To detect unauthorized modifications of data in the security container, preferred embodiments include a digital signature in each security container. (See element 140 of FIG. 1 and element 740 of FIG. 7.) Preferably, this digital signature is computed over the key classes and rules, and can therefore be used to detect modifications to the encryption header and its list of authorized users, as well as modifications to the rules. In preferred embodiments, the component creator's private key is used to create the digital signature, using a predetermined algorithm and key length. Techniques for creating digital signatures are well known in the art. For example, the digital signature is preferably computed by encrypting a hash of the aforementioned fields with the private key of the component creator. (The rules used when computing the hash in preferred embodiments are the unencrypted rules, but the encrypted rules may be used in alternative embodiments.) The digital signature is carried in the clear in the security container. Block 840 uses the component creator's public key to decrypt this digital signature, yielding an unencrypted hash value. A hash over the covered fields is then computed anew, and compared to the hash that has been obtained from the digital signature. A security container should be discarded as possibly compromised if this check of the digital signature using the component creator's public key fails to match. (As will be obvious, checking of the secure hash and of the digital signature may be performed separately, even though they are shown together in FIG. 8, and separate error processing logic may be provided for a non-matching hash and a non-matching digital signature.)

Referring once again to the diagram in FIG. 2, the rules 220 decrypted by Block 835 filter references to the methods and properties of the security container's interface 210. Accordingly, Block 855 represents passing the user's intercepted access request to the rules for evaluation, and depending on the outcome, the document component may be decrypted, deserialized, and instantiated; its method and properties 240 may be invoked; and the document component may be returned (Block 860) to the user in some form. (For example, if the document component is textual, it may be returned as text or perhaps as an image depicting the text, as discussed earlier.)

It should be noted that even though the user has some level of access to the security container's document component by reaching Block 825 and the subsequent processing, additional access-related checking may be performed by the rules, and therefore there may be cases where the user is still denied access. Otherwise, when the user has access rights, the rules operate to determine what the requester can do with the document component.

As an alternative to the sequence of logical operations depicted in the example of FIG. 8, a user could have all of the user's DNs and the DNs of groups to which the user belongs defined locally, and could scan the list of DNs in the security container's encryption header looking for a match. If a match is found, the user could then apply the associated private key to decrypt the version of the symmetric key intended for that user or group.

As an alternative to a user decrypting the rules and content with his own private key, or a group clerk decrypting the rules and content on behalf of group members, the decryption may be carried out by a client proxy that operates on behalf of the client, or by a key recovery agent that effectively operates as an authorized user of all secured content. Techniques for using key class information with a client proxy and key recovery agent are disclosed in detail in the referenced inventions (and in particular, in U.S. Pat. Nos. 6,961,849, Ser. No. 09/422,537, and 6,941,459, Ser. No. 09/422,431). Generally, communications between the client and client proxy use a mutually-authenticated secure channel, if possible, so that the client proxy can decrypt information and return it in clear text form to the client. Alternatively, the client proxy can re-encrypt information with the client's public key (or with a symmetric key shared between the client and the proxy) to securely return the information in the absence of a mutually-authenticated secure channel. Note that, in preferred embodiments, the client proxy must be an authorized user of the security container in order to access the container on behalf of the client. In the case of a key recovery agent, it may be necessary to recover encrypted document components for tracking purposes, for auditing, when the only other authorized user loses his access rights, and so forth. As disclosed in the referenced inventions, a key recovery agent can recover the clear text value of any symmetric key by having a key object defined, within each key class, for the key recovery agent. If more than one key recovery agent is allowed, then the key object can be defined as identifying a group. The key recovery agent is preferably permitted to bypass the rules filtering (e.g., by using a special ID in the rules, where this ID is associated with the key recovery agent), so it can always access all methods and properties of the embedded document component. The key recovery agent also preferably has access to any rules defined for managing the security container (as illustrated generally at 211 in FIG. 2). In any case, the key recovery process for a client proxy or a key recovery agent proceeds as has been described above with reference to FIG. 8.

At some point in interaction with a requester (e.g., when the user finishes interacting therewith), the security container object is typically asked to serialize itself (i.e., convert itself into a canonical format for storage or transmission). In turn, assuming the document component object was changed in some way from the exercise of its methods or properties, the security container serializes its contained document component, encrypts this serialized stream and the rules, and then reconstructs its own selectively-encrypted XML stream. The symmetric key that was used to decrypt the rules and the document component (which is the same key originally used for encryption thereof) is preferably used for this re-encryption, and is preferably remembered by the secure container logic that performed the decryption. (The symmetric key will typically be stored in an area of protected memory, where the unencrypted rules and other state data for the security container reside. The manner in which such protected memory operates is outside the scope of the present invention.)

While preferred embodiments have been described with reference to using the key class technique disclosed in the referenced inventions, other techniques for distributing key material, and for encoding such information within a security container, may be used alternatively without deviating from the scope of the present invention.

The specification of rules for a particular document component may vary widely, as will be obvious, and descriptions herein are provided for purposes of illustration but not of limitation. As an example of how rules may consider various factors in functional controls, suppose the document component in a security container is a confidential text file, the requesting user's context indicates that he is using a laptop computer, and that this user has a user profile indicating that he only wants to receive confidential information when using his desktop computer. In this case, the rules will prevent delivery of the document component to the requester. The rules may be written such that a substitute message is delivered in place of the requested document component, informing the user of the reason for denying his request; alternatively, he may receive an error indication or may simply receive nothing.

As another example, if the requester's context indicates that she is using a text processing application that she has configured as being in her "business" isolation zone, then the rules may check to ensure they allow processing the security container's document component with that text processing application and rendering the document component within the business isolation zone. Or, the rules might check to ensure that she is using, for example, a StarOffice® application to edit a Microsoft Word document, and prevent access to the document component unless this is the case. Or, if the user attempts to paste a diagram from a Lotus Freelance Graphics® presentation into a Word document, where the rules encapsulated in the security container for that diagram prevent this cross-application transfer, then the paste operation will not succeed. If the user subsequently copies the diagram (or perhaps an icon representing the diagram) onto the clipboard, and then attempts to paste the icon into a Freelance document, on the other hand, the rules will allow this transfer (assuming the other conditions checked by the rules have been met). ("StarOffice" is a registered trademark of Sun Microsystems, Inc. in the United States, other countries, or both, and "Freelance Graphics" is a registered trademark of International Business Machines Corporation in the United States, other countries, or both.)

As another example, suppose the user requests to print the document component of a security container. A rule might be defined that allows printing only if the user's printer supports printing in color; or, a rule might specify that printing is allowed only for selected users, whereas other users (or perhaps a different set of selected users) can view but not print the document component. Groups may be defined to identify those users who can perform various functions, as stated above. For example, a "print-me" group can be defined to identify the users who are allowed to print the document component, and a "see-me" group can be defined to identify those users who are allowed to view the document component. The group membership may be identified statically, for example by coding user IDs directly into the rules. Or, the group membership may be determined dynamically. In this case, the group name is preferably specified within the rules, and the group membership is resolved by late binding at run time (e.g., by consulting a directory to learn the up-to-date membership of the group or consulting local storage where the groups to which one belongs are enumerated). As discussed above with reference to dynamically determining group membership for authorized users, this late binding of users to groups provides a very flexible way to grant rights to users.

As yet another example, security containers as disclosed herein enable aggregation of document components to be performed in a secure fashion. For example, an on-line magazine may aggregate stories, each with its own author's security constraints, with licensed clip art copied from an electronic collection, thereby creating an aggregate document. When using security containers as disclosed herein, the security constraints of the various authors as well as the security constraints imposed by the clip art collection remain in force within the aggregate document. This is in contrast to prior art techniques, which operate at the file or document level rather than on objects within the document (i.e., objects representing individual document components), as in the present invention. These prior art techniques therefore cannot handle aggregations composed of parts with different rules regarding access and/or functional rights. In particular, the inventors know of no prior art techniques that allow copying a part or component of a document to another document and keeping the controls for that copied component intact at the destination, as in the present invention; therefore, prior art techniques do not enable aggregation to be performed in a secure fashion.

In a more complex example, content protection according to the present invention may be based upon a combination of the user's membership in a multi-privilege group structure (i.e., where multiple groups are defined, and each group has rights different than others), the application in use when the user's request is made, the isolation zone governing the application at the time of the request, the device type of the requester's computer, the network address (or address pattern) of the device, the type of keyboard attached to the device, and the current time of day when a request is received.

As yet another example, suppose a security container holds an image. The security container may be embedded in a Web page, from which users can download the image in a free "trial usage" mode. (Notably, the object that is downloaded to the requester will be the entire security container, not just the image, according to the present invention, even though the user may be unaware of this distinction.) Furthermore, suppose that it is desirable to allow users to participate in the trial usage mode only for a limited time, after which they must pay for a membership in order to have continued access to the Web site's content, including the already-downloaded image. The rules in the security container can therefore be written to enforce this scenario. For example, the rules can include code to record the date and time of the download, and to remember that the image has been provided for a limited free trial period. Each time the user accesses his copy of the downloaded image, the security container compares the date and time of the access to the date and time of downloading, to determine if the trial period has now expired. If not, the free trial period remains in effect and the user is granted access. If the free trial period has expired, on the other hand, then the security container may return an indication that the free trial period has expired, and further access requires a purchased membership. Subsequently, when the user attempts to access the previously-downloaded object (or, alternatively, for all access attempts, even during the free trial period), the rules may dynamically contact a directory or other user registry to determine whether the requesting user has purchased a membership. If so, then access is granted. The rules may also be written to grant varying types of access and to allow varying types of functional operations, which may be based on a tiered-price membership structure, if desired.

It should be noted that not all content to be controlled with a security container need be "security sensitive". Rather, the access and functional controls provided by a security container may be used to protect any type of document component. The controls enforced by a security container may be very unrestrictive, or very restrictive, or anything in between, depending on the intent of the component creator.

While preferred embodiments have been described primarily with reference to textual content, this is by way of illustration and not of limitation. Other content types may be controlled in an analogous manner. For example, a sound file may be distributed with functional controls that allow receivers to listen to, but not to record, the sound. Because techniques disclosed herein are not limited to particular content formats, and do not require configuration or registration of content formats, newly-developed object and content encodings may be supported without requiring any change to an implementation of the present invention.

An embodiment of the present invention may be incorporated within an operating system or provided as an add-on or plug-in to an operating system. Other embodiments are also within the scope of the present invention. Furthermore, it should be noted that embodiments of the present invention may be used advantageously with content that is locally stored on a user's workstation, content that is retrieved by requesting delivery from a network server or web server, content that is received through a messaging infrastructure (such as e-mail or message queuing), and so forth.

By adding considerations of context and zone to the process characteristics of an operating system (given that most operating systems already consider user and group attributes), the pasting of protected content among applications can be further controlled when using security containers as disclosed herein. Preferably, the security container construct is the only form of object allowed on the clipboard in such modified operating systems, and therefore all cut and paste operations are inherently controlled through the mediation of the security container and its rules protecting the content to be cut and pasted.

Alternatively, existing operating systems may be adapted for limiting cut and paste to security containers. One way in which this may be done, for example, is to wrap an existing API governing the insertion of content between application programs, by substituting therefor a dynamic link library ("DLL") module implementing the security container operations defined herein. (Note that the rules and the DNs specifying authorized users could be predefined by a user or an administrator and tied to specific application programs, zones, e-mail recipients, buddy lists, file system directories, etc., in order to limit insertion of content across a boundary between isolation zones of the commonly-assigned isolation zone invention. The DLL may be written, for example, to verify whether a requesting user is authorized, and to then automatically select an appropriate "protection profile" that provides rules for the requested document component or perhaps display a selection of such protection profiles to the user, from which she can make a selection. Or, the user might be allowed to explicitly set the rules to be used.) Then, when content is to be pasted from the clipboard to another application, the security container's rules are invoked to determine whether the paste operation will be carried out. A "clipboard viewer" may be provided as a plug-in extension to an existing clipboard and be invoked whenever content is added to the clipboard. Upon invocation, the plug-in preferably creates a security container protecting the content to be added to the clipboard, and removes any data already present in the clipboard buffer that is not protected by a security container. In this manner, content can be protected by a security container whenever a request is made to transfer content between applications. Moreover (going far beyond the teachings of the isolation zone invention), once a document component is protected within the present invention's security container and transferred to another recipient, the container continues to enforce the component creator's intentions with respect to access control and functional control for that document component.

If the document component is created using an application that understands the security containers of the present invention, the application may prompt the component creator for appropriate values (or may use default values) for the security container's rules and authorized users, and the document component will be protected according to the present invention from the time of its initial creation.

If the document component is created by a first application that is not aware of the present invention's security containers, then it can be later protected in a security container by invoking a security-container-aware second application that determines proper values for the rules and authorized users and protects the document component subsequently. For example, a clip-art creator could create artwork using conventional artwork creation tools and save the artwork in a conventional file system. When the creator is ready to package the clip-art as a library for sale, the creator could invoke a second application to protect the clip-art items within a security container and specify rules requiring (for example) payment after a trial use period, and only distribute the clip-art library in the protected security-container form.

Figure 9:
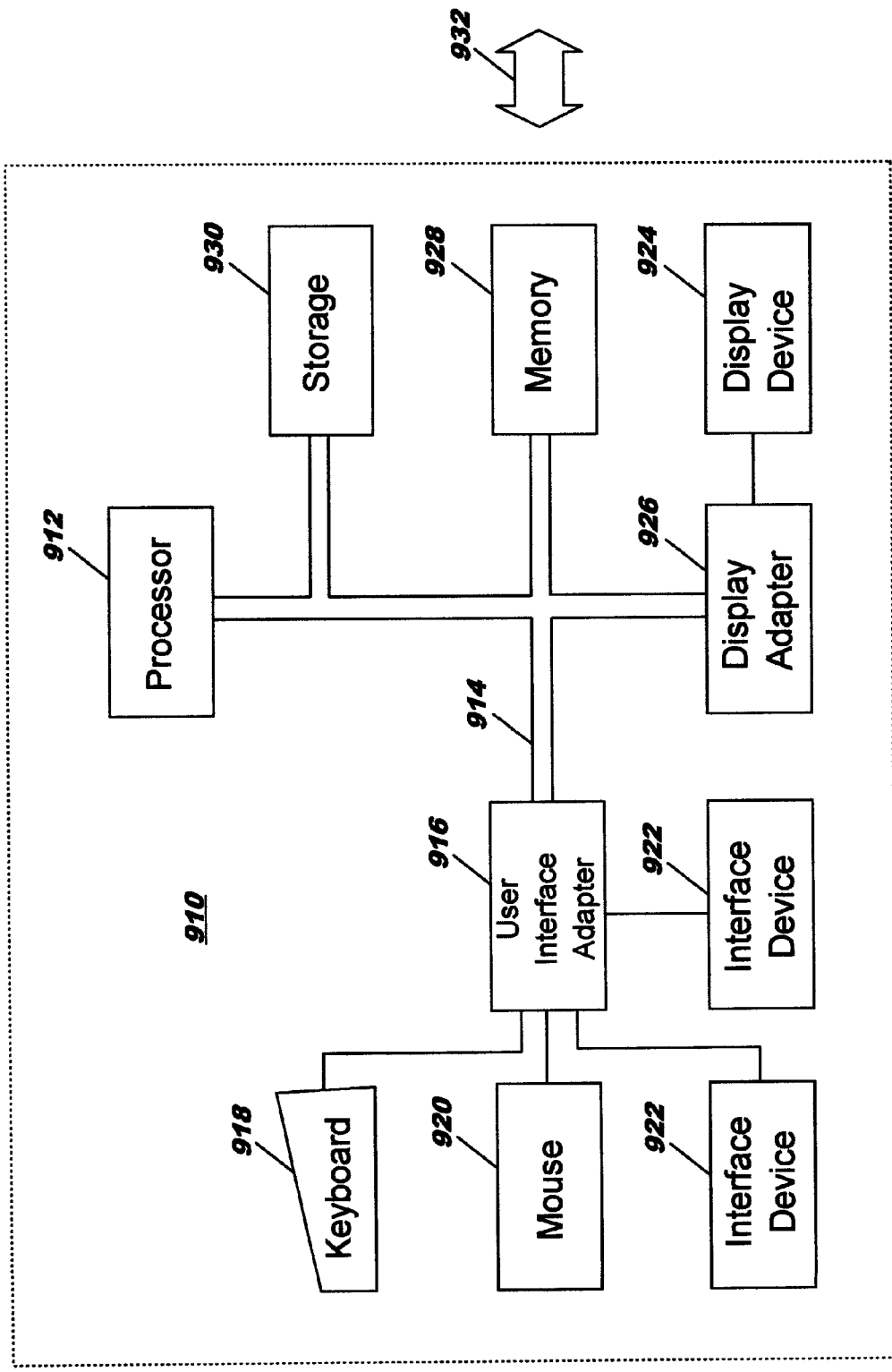
FIG. 9 is a block diagram of a computer hardware environment in which the present invention may be practiced.

FIG. 9 illustrates a representative workstation hardware environment in which the present invention may be practiced. The environment of FIG. 9 comprises a representative single user computer workstation 910, such as a personal computer, including related peripheral devices. The workstation 910 includes a microprocessor 912 and a bus 914 employed to connect and enable communication between the microprocessor 912 and the components of the workstation 910 in accordance with known techniques. The workstation 910 typically includes a user interface adapter 916, which connects the microprocessor 912 via the bus 914 to one or more interface devices, such as a keyboard 918, mouse 920, and/or other interface devices 922, which can be any user interface device, such as a touch sensitive screen, digitized entry pad, etc. The bus 914 also connects a display device 924, such as an LCD screen or monitor, to the microprocessor 912 via a display adapter 926. The bus 914 also connects the microprocessor 912 to memory 928 and long-term storage 930 which can include a hard drive, diskette drive, tape drive, etc.

The workstation 910 may communicate with other computers or networks of computers, for example via a communications channel or modem 932. Alternatively, the workstation 910 may communicate using a wireless interface at 932, such as a cellular digital packet data ("CDPD") card. The workstation 910 may be associated with such other computers in a local area network ("LAN") or a wide area network ("WAN"), or the workstation 910 can be a client in a client/server arrangement with another computer, etc. All of these configurations, as well as the appropriate communications hardware and software, are known in the art.

Figure 10:
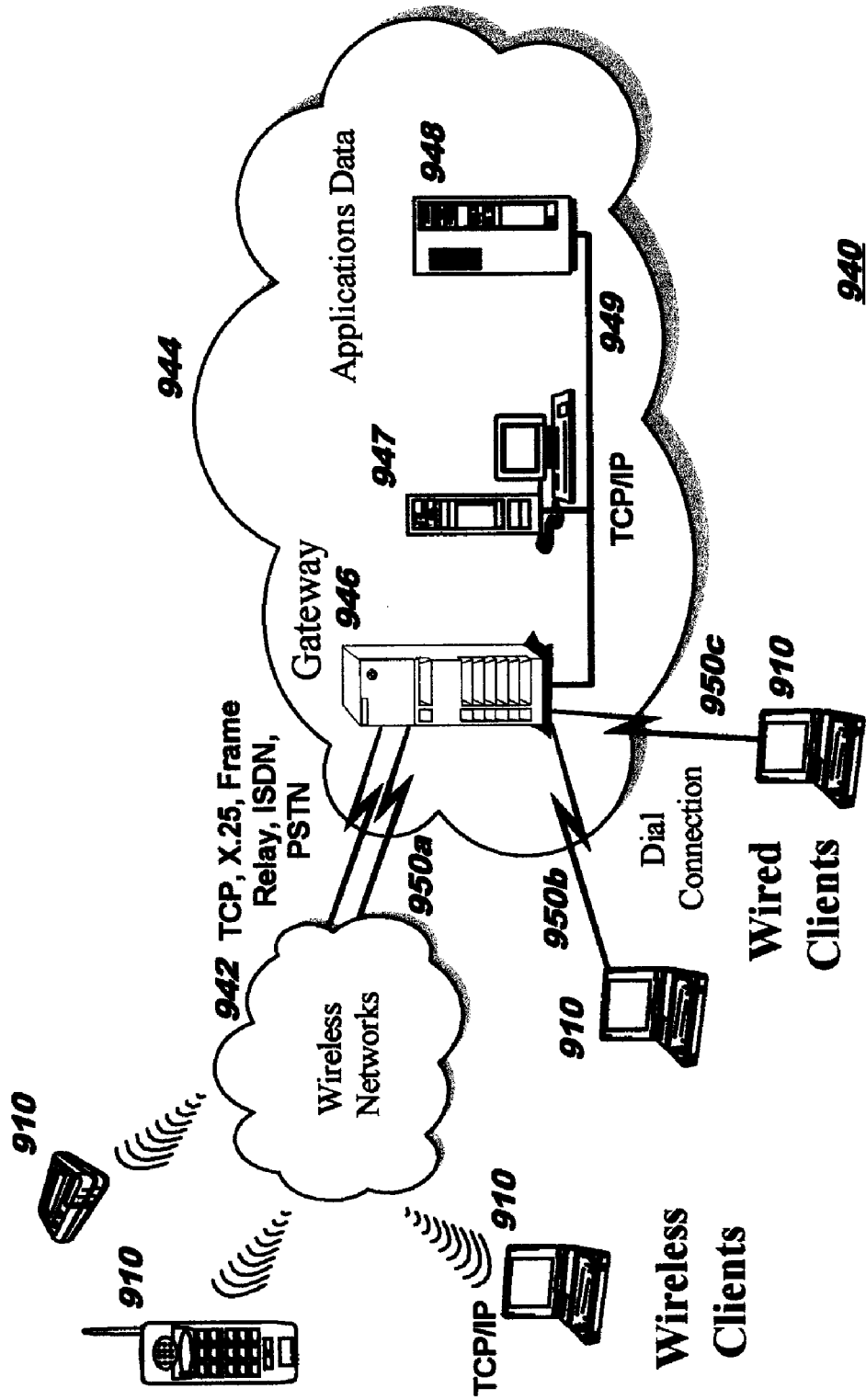
FIG. 10 is a diagram of a networked computing environment in which the present invention may be practiced.

FIG. 10 illustrates a data processing network 940 in which the present invention may be practiced. The data processing network 940 may include a plurality of individual networks, such as wireless network 942 and network 944, each of which may include a plurality of individual workstations 910. Additionally, as those skilled in the art will appreciate, one or more LANs may be included (not shown), where a LAN may comprise a plurality of intelligent workstations coupled to a host processor.

Still referring to FIG. 10, the networks 942 and 944 may also include mainframe computers or servers, such as a gateway computer 946 or application server 947 (which may access a data repository 948). A gateway computer 946 serves as a point of entry into each network 944. The gateway 946 may be preferably coupled to another network 942 by means of a communications link 950a. The gateway 946 may also be directly coupled to one or more workstations 910 using a communications link 950b, 950c. The gateway computer 946 may be implemented utilizing an Enterprise Systems Architecture/370™ available from the International Business Machines Corporation ("IBM®"), an Enterprise Systems Architecture/390® computer, etc. Depending on the application, a midrange computer, such as an Application System/400® (also known as an AS/400®) may be employed. ("Enterprise Systems Architecture/370" is a trademark of IBM; "IBM", "Enterprise Systems Architecture/390", "Application System/400", and "AS/400" are registered trademarks of IBM in the United States, other countries, or both.) The gateway computer 946 may also be coupled 949 to a storage device (such as data repository 948).

Those skilled in the art will appreciate that the gateway computer 946 may be located a great geographic distance from the network 942, and similarly, the workstations 910 may be located a substantial distance from the networks 942 and 944. For example, the network 942 may be located in California, while the gateway 946 may be located in Texas, and one or more of the workstations 910 may be located in Florida. The workstations 910 may connect to the wireless network 942 using a networking protocol such as the Transmission Control Protocol/Internet Protocol ("TCP/IP") over a number of alternative connection media, such as cellular phone, radio frequency networks, satellite networks, etc. The wireless network 942 preferably connects to the gateway 946 using a network connection 950a such as TCP or User Datagram Protocol ("UDP") over IP, X.25, Frame Relay, Integrated Services Digital Network ("ISDN"), Public Switched Telephone Network ("PSTN"), etc. The workstations 910 may alternatively connect directly to the gateway 946 using dial connections 950b or 950c. Further, the wireless network 942 and network 944 may connect to one or more other networks (not shown), in an analogous manner to that depicted in FIG. 10.

Software programming code which embodies the present invention is typically accessed by the microprocessor 912 of the workstation 910 and/or server 947 from long-term storage media 930 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems. Alternatively, the programming code may be embodied in the memory 928, and accessed by the microprocessor 912 using the bus 914. The techniques and methods for embodying software programming code in memory, on physical media, and/or distributing software code via networks are well known and a detailed discussion thereof is not deemed necessary to an understanding of the present invention.

As has been demonstrated, the present invention provides a number of advantages, including allowing all users and requesting processes to receive an identical copy of content to be controlled, even though the access and functional rights of those users and processes may vary widely. As an added benefit, exposures due to inadvertent or malicious dissemination of confidential or sensitive content are limited by the built-in access and functional restrictions that are enforced by the encapsulated rules. Furthermore, in the prior art, once a user successfully decrypts content, he is generally free to distribute that content in clear text form. As a result, the content may be received by persons who are not authorized to have it. The present invention, on the other hand, avoids this problem by always distributing the content with its security container and embedded rules (where the rules are preferably written to prevent the user from being able to copy content that should not be distributed beyond that user). Techniques disclosed herein enable changing the security algorithm, key, and key length from one security container to another (in addition to changing the access and functional rules), not only among a collection of documents but also within a single compound document, and thus a very flexible and powerful content protection strategy can be achieved.

Techniques are known in the art whereby "digital rights management", or "DRM", file formats are used to secure movie, sound, and presentation files so that they can only be played by certain users on certain devices. However, to the best of the inventors' knowledge and belief, no prior art techniques are known that distribute an identical controlled object to all receivers, where the controlled object may be a portion of a higher-level construct, without regard to the type of content being controlled, where the distributed object carries its own securely-embedded key recovery information and rules, as is done with the security containers of preferred embodiments.

While preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

What is claimed is:

1. A security container stored in memory that secures a document component by encapsulating, within the security container, an encrypted version of the document component, an encrypted version of conditional logic for controlling operations on the document component, and key distribution information usable for controlling access to the document component, wherein:

the encrypted version of the document component and the encrypted version of the conditional logic are both encrypted using a first key;

the key distribution information comprises at least two key elements; and each key element comprises (i) an identification of a user, a user group, a process, or a process group that is authorized to access the document component; and (ii) an encrypted version of the first key, wherein the encrypted version of the first key comprises the first key encrypted using a second key that is usable only by the identified user, user group, process, or process group for decrypting the encrypted version of the first key, thereby enabling that user, user group, process, or process group to obtain the first key and use it for decrypting the document component and the conditional logic.

2. The security container according to claim 1, wherein the document component comprises a portion of a higher-level document and the security container secures the portion of the higher-level document.

3. The security container according to claim 2, wherein the higher-level document has more than one portion secured by security containers.

4. A computer program product for securing document content using security containers, the computer program product embodied on one or more computer-readable media and comprising:

computer-readable program code for receiving, from a requester, a request to access document content, wherein the document content is encapsulated as an encrypted version of a document component within a security container along with an encrypted version of conditional logic for controlling operations on the document component and key distribution information usable for controlling access to the document component, wherein:

the encrypted version of the document component and the encrypted version of the conditional logic are both encrypted using a first key;

the key distribution information comprises at least two key elements; and each key element comprises (i) an identification of a user, a group of users, a process, or group of a processes that is authorized to access the document component; and (ii) an encrypted version of the first key, wherein the encrypted version of the first key comprises the first key encrypted using a second key that is usable only by the identified user, user group, process, or process group for decrypting the encrypted version of the first key, thereby enabling that user, group of users, process, or groups of processes to obtain the first key and use it for decrypting the document component and the conditional logic;

computer-readable program code for programmatically determining, using the key distribution information, whether the requester is authorized to access the document component by determining whether, in any selected one of the key elements, the requester is the identified user or the identified process or is a member of the identified group of users or of the identified group of processes, and if so, performing steps of:

decrypting the encrypted version of the first key from the selected one of the key elements using the second key usable by that requester, thereby obtaining the first key;

decrypting the encrypted version of the conditional logic using the first key, thereby obtaining the conditional logic;

decrypting the encrypted version of the document component using the first key, thereby obtaining the document component; and programmatically evaluating, using the conditional logic, whether the request can be granted; and computer-readable program code for rejecting the request when operation of the computer-readable program code for programmatically determining yields a negative result.

5. A system for securing document content using security containers, comprising:

a security container that encapsulates an encrypted version of a document component, an encrypted version of conditional logic for controlling operations on the document component, and key distribution information usable for controlling access to the document component, wherein:

the encrypted version of the document component and the encrypted version of the conditional logic are both encrypted using a first key;

the key distribution information comprises at least two key elements; and each key element comprises (i) an identification of a user, a group of users, a process, or group of a processes that is authorized to access the document component; and (ii) an encrypted version of the first key, wherein the encrypted version of the first key comprises the first key encrypted using a second key that is usable only by the identified user, user group, process, or process group for decrypting the encrypted version of the first key, thereby enabling that user, group of users, process, or groups of processes to obtain the first key and use it for decrypting the document component and the conditional logic;

means for receiving, from a requester, a request to access the document component;

means for programmatically determining, using the key distribution information, whether the requester is authorized to access the document component by determining whether, in any selected one of the key elements, the requester is the identified user or the identified process or is a member of the identified group of users or of the identified group of processes, and if so, performing steps of:

decrypting the encrypted version of the first key from the selected one of the key elements using the second key usable by that requester, thereby obtaining the first key;

decrypting the encrypted version of the conditional logic using the first key, thereby obtaining the conditional logic;

decrypting the encrypted version of the document component using the first key, thereby obtaining the document component; and programmatically evaluating, using the conditional logic, whether the request can be granted; and means for rejecting the request when operation of the means for programmatically determining yields a negative result.

6. The system according to claim 5, wherein the security container is embedded within a document.

7. The system according to claim 5, wherein the security container encapsulates the document component on a system clipboard.

8. The system according to claim 5, wherein the security container is placed on a user interface.

9. The system according to claim 5, wherein the security container encapsulates the document component for exchange using interprocess communications.

10. The system according to claim 5, wherein the security container encapsulates the document component for exchange using a messaging system.

11. The system according to claim 5, further comprising means for copying the document component to a target destination, wherein the means for copying copies the entire security container in order to copy the document component.

* * * * *